United States Patent [19]
Chen et al.

[11] Patent Number: 5,755,503
[45] Date of Patent: May 26, 1998

[54] OPTICAL ILLUMINATION SYSTEM HAVING IMPROVED EFFICIENCY AND UNIFORMITY AND PROJECTION INSTRUMENT COMPRISING SUCH A SYSTEM

[75] Inventors: Kuang-Yu Chen, Taipei Hsien; San-Ming Chen, Taipei; Zu-Deh Hao, Hsinchu Hsien, all of Taiwan

[73] Assignee: Industrial Technology Research Institute, Taiwan

[21] Appl. No.: 554,968

[22] Filed: Nov. 13, 1995

[51] Int. Cl.$^6$ .................................................. G03B 21/14
[52] U.S. Cl. ........................... 353/38; 353/99; 353/31; 362/297
[58] Field of Search ........................... 353/38, 99, 98, 353/94; 359/8, 61, 67; 362/297, 298, 299, 304, 305, 307, 346

[56] References Cited

U.S. PATENT DOCUMENTS 4,127,322  11/1978  Jacobson et al. ...................... 353/31
4,417,300  11/1983  Bodmer ................................. 362/297
5,098,184   3/1992  van den Brandt et al. ........... 353/102
5,123,729   6/1992  Kondo ..................................... 353/99
5,418,583   5/1995  Masumoto ............................. 353/38
5,607,229   3/1997  Rykowski et al. .................... 362/297

*Primary Examiner*—William Dowling
*Attorney, Agent, or Firm*—Rabin, Champagne & Lynt, P.C.

[57] ABSTRACT

An illumination system having improved efficiency and uniformity for an image projection apparatus. The illumination system is employed for supplying an optical radiation beam along a principal axis to illuminate an object which, in a plane perpendicular to the principal axis, has a non-round cross-section. The illumination system includes: a light source for emitting light beams; a reflective mirror, having a plurality of reflective curved surfaces for reflecting the light beams emitted from the light source to form a plurality of reflective beams; and a lens plate, having a plurality of lenses, each of the plurality of lenses corresponding to a reflective curved surface of the reflective mirror to project the plurality of reflective beams onto the object, so that the plurality of reflective beams are superimposed on the object and produce a uniform illumination.

16 Claims, 7 Drawing Sheets

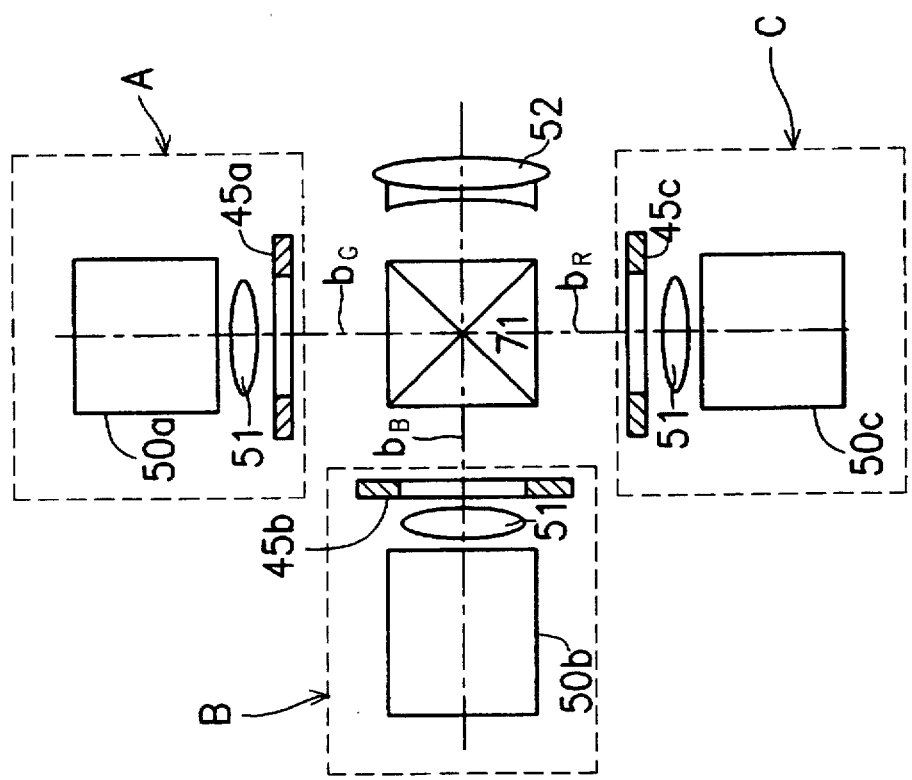

OPTICAL ILLUMINATION SYSTEM HAVING IMPROVED EFFICIENCY AND UNIFORMITY AND PROJECTION INSTRUMENT COMPRISING SUCH A SYSTEM

BACKGROUND OF THE INVENTION

1. Field of the Invention

The present invention relates to an illumination system for supplying an optical radiation beam along a principal axis and is intended for illuminating an object which, in a plane perpendicular to the principal axis, has a non-round cross-section. The present invention also relates to an image projection apparatus comprising such an illumination system for illuminating at least one image display panel by means of which an image is generated and is projected on a projection screen via a projection lens system.

2. Description of Prior Art

The cross-section of a light beam generated by a conventional illumination system is round. Since the projection area is normally rectangular, therefore, by using the light beam having round cross-section, the light intensity outside the round cross-section may not be effective.

Referring to FIG. 1, the round cross-section light beam 1 illuminates the rectangular image area 2. In the example, four regions 3 cannot be effectively used. As a result, the efficiency of the illumination system is diminished.

U.S. Pat. No. 5,098,184 describes an illumination system, referring to FIG. 2, which comprises a radiation source 20, a concave reflector 21, and a first and a second lens plate 25 and 28 each being provided with a matrix of lenses 26 and 29 for forming superimposed images of the radiance source on the object 1 to be illuminated, the aspect ratio of the lenses 26 and 29 corresponding to that of the object 1. However, while the prior art mentioned above may solve the optical efficiency problems and improve the uniformity, it requires a tremendous amount of space since it comprises a light source 20, a reflective mirror 21, a first lens plate 25, a second lens plate 28 and a third lens 31. In addition, a certain distance is required between the first lens plate 25 and the second lens plate 28. Although it is possible to integrate the first and the second lens plates, and form a lens matrix structure on two sides of a bulky glass, thus reducing the distance to 0.65of the original distance, the two-sided lens matrix structure is difficult to manufacture and increases the weight of the illumination system. Although the second lens plate 28 and the third lens 31 may also be combined to reduce one component, the distance between the first lens plate 25 and the second lens plate 28 which is the primary determinant of device space remains unchanged.

The factors for judging whether an illumination system is good or not are, besides the optical efficiency and the optical uniformity, the volume space, weight and initial cost of the system, each of which affects the utility of the illumination system.

SUMMARY OF THE INVENTION

Accordingly, the primary object of the present invention is to provide an illumination system with a small volume space, high illuminating efficiency and image projection uniformity, which can be used to illuminate an object having a non-round cross-section on a plane perpendicular to the principal axis.

Another object of the present invention is to provide the architectures of an illumination system and an image projection apparatus using such illumination system, wherein the illumination system is simplified and includes a reduced number of components.

To achieve the above objects, the present invention uses a reflective mirror having a plurality of reflective curved surfaces to collect the light beams emitted from the light source, in which each of the reflective curved surfaces has its own curvature and tilting angle, but also has a same height/width ratio for the projection along the optical axis of each reflective beam as well as the cross-section of the object. The light beam emitted from the light source is divided into a plurality of sub-beams after reflecting by the reflective mirror. These sub-beams are converged to a lens plate having a plurality of lenses respectively corresponding to the plurality of reflective curved surfaces. The configuration and dimension of each lens on the lens plate depends on the illumination distribution of the corresponding reflective curved surfaces, by which all of the sub-beams may be superimposed on the object after passing through the lens plate to obtain high efficiency and uniformity of illumination.

BRIEF DESCRIPTION OF THE DRAWINGS

The following detailed description, given by way of example and not intended to limit the invention solely to the embodiments described herein, will best be understood in conjunction with the accompanying drawings in which:

FIG. 8 is a diagram for illustrating the architecture of another preferred embodiment of the image projection apparatus employing an illumination system of the present invention.

In all of the figures, the identical reference numeral represents the same or similar component of the optical illumination system utilized for the description of the present invention.

DETAILED DESCRIPTION OF THE PREFERRED EMBODIMENTS

Figure 1:
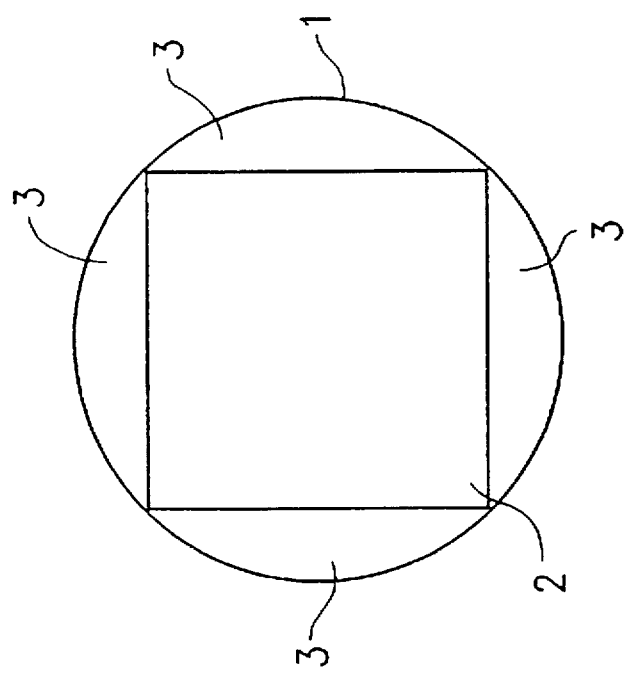
FIG. 1 is a diagram for illustrating using a light beam having a round cross-section to illuminate an rectangular image.
Figure 2:
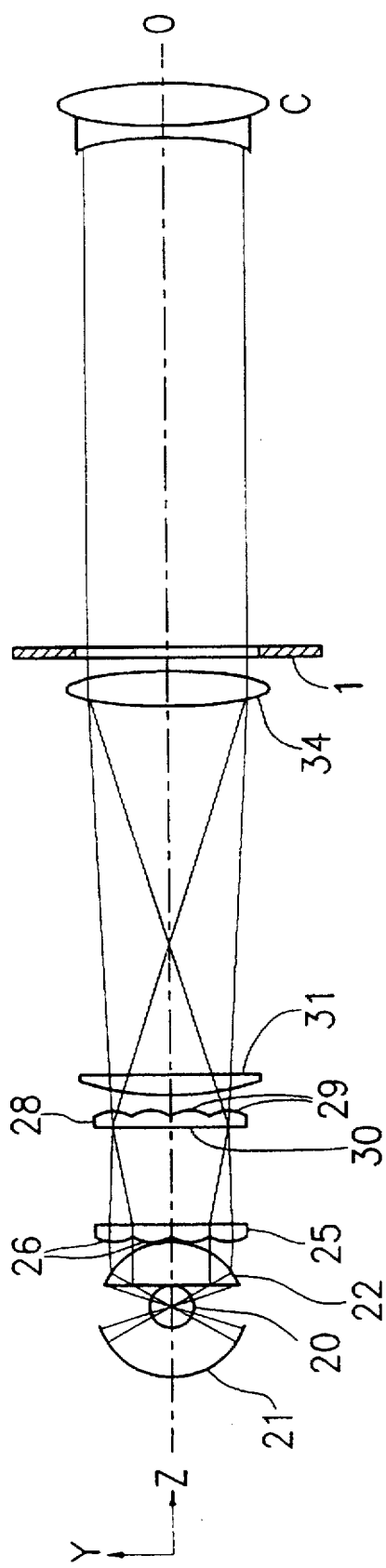
FIG. 2 is a diagram for illustrating the architecture of a conventional illumination system.
Figure 3:
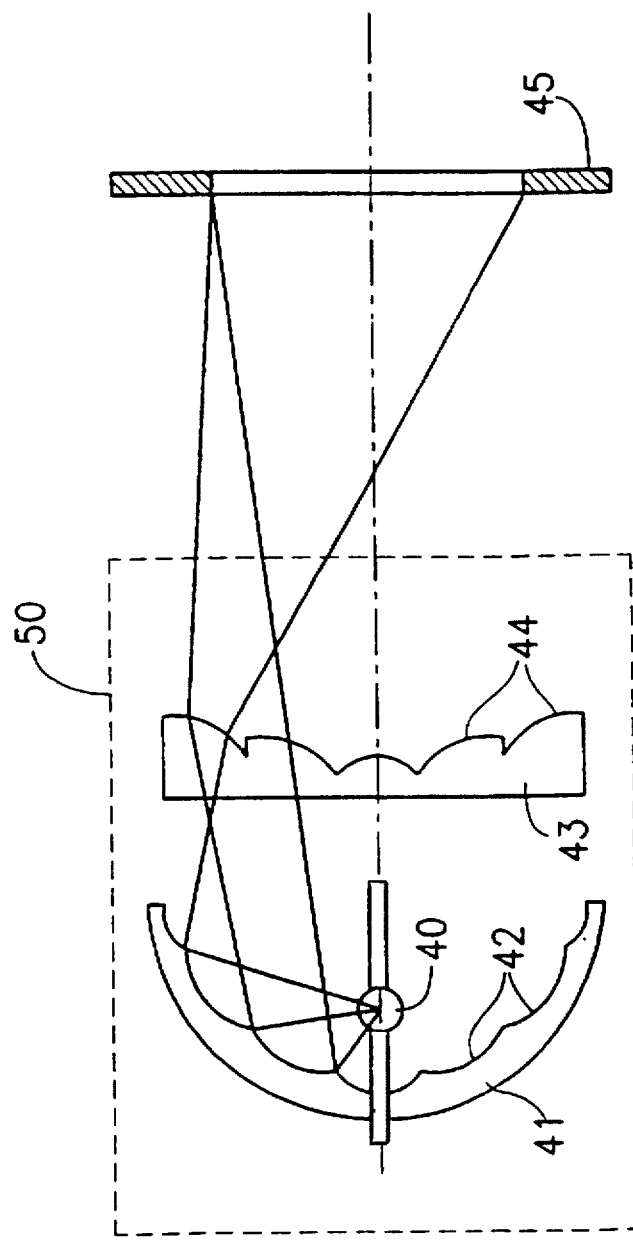
FIG. 3 is a diagram for illustrating the architecture of an illumination system according to the present invention.

Referring to FIG. 3, an illumination system 50 of the present invention includes a light source 40, a reflective mirror 41 and a lens plate 43. For the sake of clarification, the numbers of reflective curved surfaces 42 and lenses 44 are reduced in the drawing.

Figure 4:
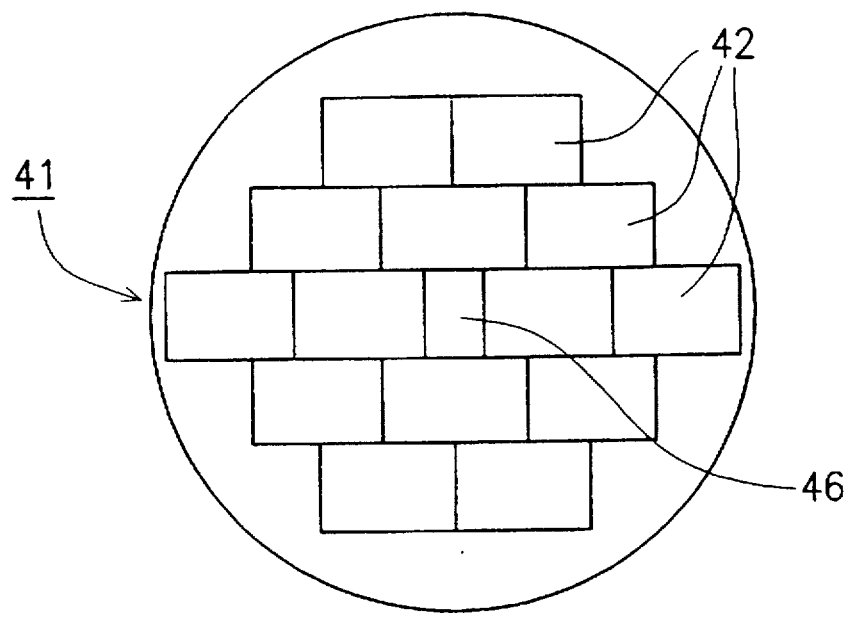
FIG. 4 is a front diagram for illustrating the reflective mirror employed in an illumination system of the present invention.

The structure of components in the illumination system of the present invention are described below. First, as shown in FIG. 3, the reflective mirror 41 is a curved surface which may be spherical or aspherical. A plurality of reflective curved surfaces 42 are formed on the interior of the reflective mirror 41 wherein the plurality of reflective curved surfaces 42 may also be spherical or aspherical. Each of the reflective curved surfaces 42 may have different curvatures and tilting angles, though. The projection of the beams reflected from each of the reflective curved surfaces should have the same height/width ratio as the cross-section of the object 45 along the principal axis. Therefore, if the cross-section of the object 45 is rectangular, each of reflective curved surfaces has the same height/width ratio as shown in FIG. 4. In the drawings, reference number 46 indicates a hole for mounting the light source while the light source 40 is configured along the optical axis of the reflective mirror 41. The dimensions of the hole 46 may be changed to accommodate different types of light sources. After being reflected by the plurality of reflective curved surfaces 42 on the reflective mirror 41, the light beams from the light source 40 are converged by the corresponding lens 44 on the lens plate 43. The tilting angle of each lens on the lens plate 43 has to be arranged to superimpose the light beams on the object after being refracted thereby.

Figure 5:
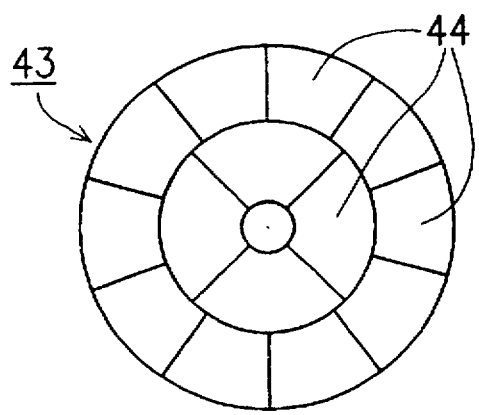
FIG. 5 is a front diagram for illustrating the lens plate employed in an illumination system of the present invention.

The lens plate 43 per se may be a plate or a curved surface. Take the system shown in FIG. 3 for example, in which the lens plate being used is a plane and includes a plurality of lenses 44. Each of the plurality of lenses 44 may be a spherical lens or an aspherical lens, depending on the requirements of system design. In addition, the boundary between any two lenses does not have to be smooth. That is, the curvature variation between any two lenses may not be continuous. The shape of the lenses 44 may be circular, ellipsoidal, sectorial, or the like. Referring to FIG. 5, which is a front view of an embodiment of the lens plate 43 that corresponds to the reflective mirror 41 as shown in FIG. 4, the lens plate 43 is arranged as a concentric circle in which the exterior circle has ten lenses and the interior circle has four lenses wherein each lens corresponds to one reflective curved surface of the reflective mirror 41. The arrangement of the lens plate 43 as shown in FIG. 5 is provided only for purposes of description and is not intended to limit the scope of the present invention. The arrangement of the lenses 44 on the lens plate superimposes the reflecting light beams over the object. The configuration of lenses on the lens plate 43, however, is random and may be asymmetrical or symmetrical such as radial or circular, etc. On the other hand, the number of the lenses 44 in an illumination system must be equal to the number of the reflective curved surfaces at least, since each of the lenses 44 is employed to receive at most one reflective beam from the reflective curved surfaces 42.

The system as shown in FIG. 3 may be accomplished by the following steps: First, the dimension of the reflective mirror is selected and a determination is made of the shape of the reflective mirror per se in compliance with the limitations of the selected light source and the volume space of the illumination system. Next, the height/width ratio of each reflective curved surface is set in accordance with the height/width ratio of the object. Meanwhile, the dimensions of the reflective curved surface are also determined by considering the restriction of the minimal practical height/width ratio of the reflective curved surface during fabrication, and then arranging the positions and types of each of the lenses to meet the requirement of superimposing all of the reflective beams on the object.

After designing the illumination system, the molds of the reflective mirror and the lens plate are fabricated according to the design result. And die casting and injection moulding may be used to form the components.

The illumination system of the present invention includes only three components, in which the reflective mirror 41 and the lens plate 43 may be fabricated by casting or moulding, so that the illumination system can be mass produced at low initial cost, featuring a simple fabricating process and easy assembly. In addition, its reliability is increased and its light-emitting efficiency is raised because of fewer components being included therein.

Figure 6:
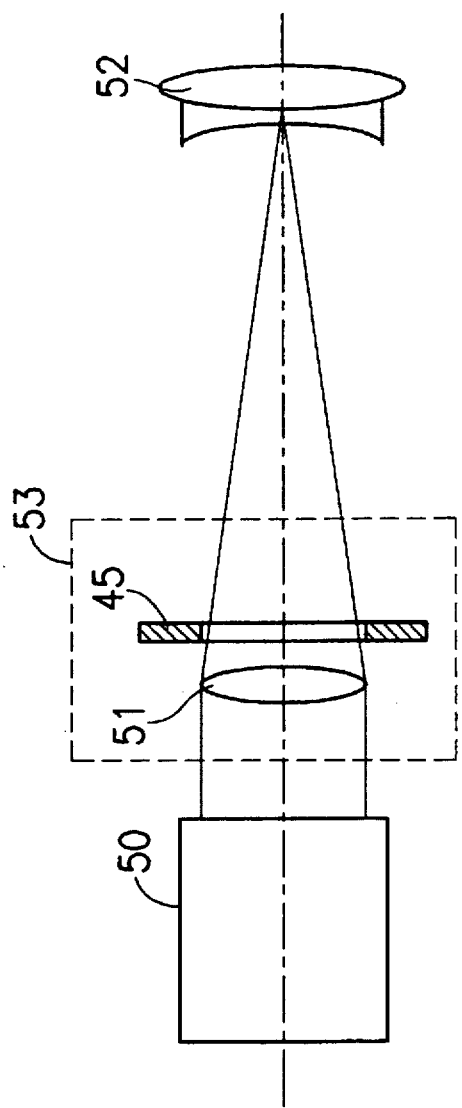
FIG. 6 is a diagram for illustrating the basic architecture of an image projection apparatus employing an illumination system of the present invention.

Referring to FIG. 6, the basic architecture of an image projection apparatus includes three main portions: the illumination system 50, the display system 53 and a projection system 52. The principal axis of the illumination system 50 is in alignment with the optical axis of the projection axis. The display system 53 may or may not have lens 51 placed in front of the object 45 for converging the incident beam from the illustration system 50.

Figure 7:
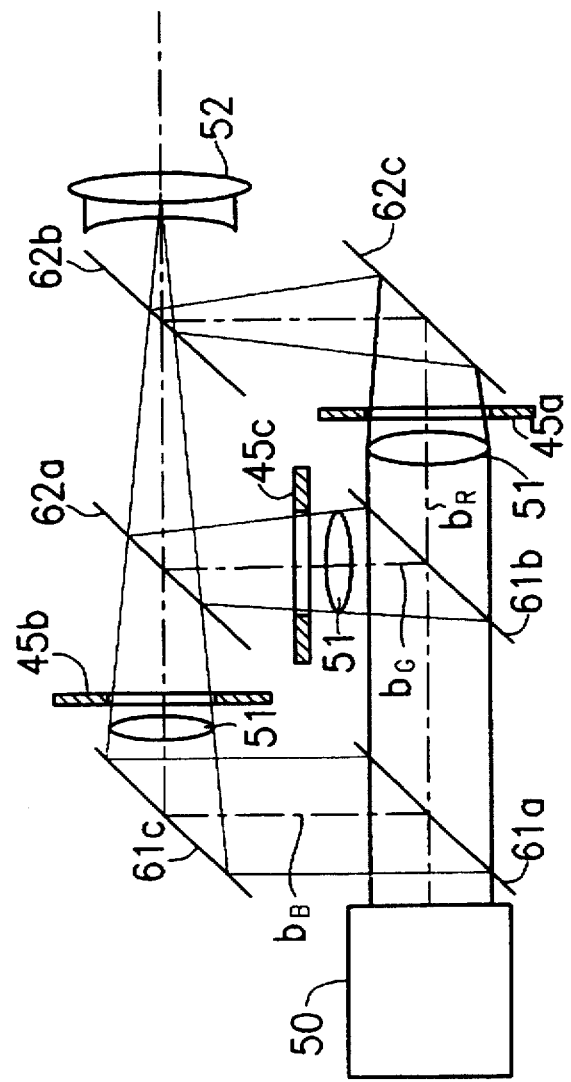
FIG. 7 is a diagram for illustrating the architecture of a preferred embodiment of the image projection apparatus employing an illumination system of the present invention.

Two preferred embodiments of color image projection apparatus are described below. Referring to FIG. 7, the beam from the illumination system 50 is incident on a color-selective reflector 61a, for example, a dichroic mirror which reflects, for example the blue color component $b_B$ and passes the rest of the beam. This beam portion reaches a second color-selective reflector 61b which reflects the green color component $b_G$ and passes the remaining red color component $b_R$ through the first display panel 45a to a reflector 62c. The reflector 62c may be a neutral reflector or a reflector which is optimized for red light. The blue beam is reflected by a neutral or a blue-selective reflector 61c to a display panel 45b in the form of a liquid crystal panel. This panel is electronically driven in a known manner so that the blue component of the image to be projected appears on this panel. The beam modulated with the blue information reaches the projection lens system 52 via a color-selective reflector 62a, which passes the blue beam and reflects the green beam, and a further color-selective reflector 62b which passes the blue beam and reflects the red beam. The green beam $b_G$ transverses a second display panel 45c where it is modulated with the green color component and then reaches the projection lens system 52 via the color-selective reflectors 62a and 62b. The red beam $b_R$ transverses a third display panel 45a where it is modulated with the red color component and subsequently reflected to the projection lens system 52 by the color-selective reflectors 62c and 62b.

The blue, red and green beams are superimposed at the input of the projection lens system so that a color image is created at this input which is imaged in a magnified form by this system on a projection screen not shown in FIG. 7.

The optical path lengths between the output of the illumination system 50 and each display panel 45a, 45b and 45c are preferably equal so that the cross-sections of the beams $b_B$, $b_G$ and $b_R$ are equal at the location of their display panel. Also the optical path lengths between the display panels 45a, 45b and 45c and the input aperture of the projection lens system are preferably equal so that the differently colored scenes are satisfactorily superimposed on the projection screen.

Each lens 51 arranged in front of the display panels 45a, 45b and 45c corresponds to the lens 51 of FIG. 6 and ensures that all radiation coming from the exit plane of the illumination system is concentrated at the entrance pupil of the projection lens system 52.

FIG. 8 is a diagrammatic plan view of a color image projection apparatus using three color channels A, B and C for the primary colors green, blue and red, respectively. Each color channel comprises an illumination system 50a according to the invention, a lens 51 and a transmission display panel 45a. These elements are shown in the green channel A. Corresponding elements are arranged in the same manner in the other channels. The differently colored beams $b_G$, $b_B$ and $b_R$ modulated with the image information are combined to one beam $b_{RE}$ by, for example a dichroic cross 71, which beam is projected on a display screen (not shown) by the projection lens system 52.

The illustration system according to the invention may not only be used for illustrating a liquid crystal display panel, but also for illuminating a display system using a cathode ray tube in combination with a photo conducting layer and a layer of liquid crystalline material as is described in U.S. Pat. No. 4,127,322.

The invention may generally be used in those cases where a non-round object must be illuminated and where very efficient use should be made of the radiation supplied by a radiation source.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An illumination system for supplying an optical radiation beam along a principal axis and illuminating an object which, in a plane perpendicular to the principal axis, has a non-round cross-section, said system comprising:

a light source for emitting a light beam;

a reflective mirror, having a plurality of reflective curved surfaces, for reflecting the light beam emitted from the light source to form a plurality of reflected beams; and a lens plate, having a plurality of lenses, each of the plurality of lenses corresponding to a reflective curved surface of the reflective mirror to project a plurality of reflected beams onto an object, so that the plurality of reflected beams are superimposed on the object and produce a uniform illumination.

2. An illumination system as claimed in claim 1 wherein the superimposed reflected beams have a shape corresponding to the cross section of the object along a principal axis.

3. An illumination system as claimed in claim 1 wherein the reflective mirror is a curved surface.

4. An illumination system as claimed in claim 1 wherein each reflective curved surface of the reflective mirror is spherical.

5. An illumination system as claimed in claim 1 wherein each reflective curved surface of the reflective mirror is aspherical.

6. An illumination system as claimed in claim 1 wherein the lens plate per planar.

7. An illumination system as claimed in claim 1 wherein the lens plate is curved.

8. An illumination system as claimed in claim 1 wherein the number of lenses on the lens plate is at least equal to the number of reflective curved surfaces on the reflective mirror.

9. An illumination system as claimed in claim 1 wherein the reflective mirror has a hole formed at the center thereof for mounting the light source.

10. An illumination system as claimed in claim 1 wherein the cross section of the object along the principal axis is rectangular.

11. An illumination system as claimed in claim 1 wherein the arrangement of the plurality of lenses on the lens plate is symmetrical.

12. An illumination system as claimed in claim 1 wherein the arrangement of the plurality of lenses on the lens plate is asymmetrical.

13. An illumination system as claimed in claim 1 wherein the lens plate is fabricated by molding glass.

14. An image projection apparatus comprising successively an illumination system, an information display system having at least one display panel for generating images to be projected and a projection lens system for projecting said images on a screen, characterized in that the illumination system is a system as claimed in claim 1 and in that a lens for imaging an exit pupil of the illumination system on the entrance pupil of the projection lens system is arranged in the radiation path in front of and proximate to said at least one display panel.

15. A color image projection apparatus having three color channels for three primary colors red, green and blue, each color channel comprising a separate display panel, wherein said color image projection apparatus comprises one illumination system as claimed in claim 1 for supplying separate beams to said three color channels via a color-splitting means.

16. A color image projection apparatus having three color channels for three primary colors red, green and blue, each channel comprising a separate display panel, wherein each color channel comprises a separate illumination system as claimed in claim 1.

* * * * *